United States Patent
Pascarella et al.

[11] Patent Number: 6,055,582
[45] Date of Patent: Apr. 25, 2000

[54] SCSI DUPLEX-READY BACKPLANE FOR SELECTIVELY ENABLING SCSI SIMPLEX AND DUPLEX MODES BASED ON INDICATION OF DESIRED SCSI MODE

[75] Inventors: Randall J. Pascarella, Spring; Vincent Nguyen, Sugarland, both of Tex.

[73] Assignee: Compaq Computer Corporation, Houston, Tex.

[21] Appl. No.: 09/008,702

[22] Filed: Jan. 16, 1998

[51] Int. Cl.[7] ................................................ G06F 13/14
[52] U.S. Cl. ........................ 710/14; 710/107; 710/128; 710/131
[58] Field of Search .............................. 710/14, 107, 128, 710/131; 711/114; 712/33

[56] References Cited

U.S. PATENT DOCUMENTS

| | | | |
|---|---|---|---|
| 5,495,584 | 2/1996 | Holman, Jr. et al. | 395/308 |
| 5,572,685 | 11/1996 | Fisher et al. | 395/287 |
| 5,613,074 | 3/1997 | Galloway | 395/280 |
| 5,745,795 | 4/1998 | Pecone et al. | 395/882 |

OTHER PUBLICATIONS

Quality Semiconductor, Inc., "High–Speed CMOS Quadruple Bus Switches with Individual Enables," QS3125 Preliminary, Aug. 1994, pp. 4–1 through 4–4.

*Primary Examiner*—Thomas C. Lee
*Assistant Examiner*—Harold Kim

*Attorney, Agent, or Firm*—Akin, Gump, Strauss, Hauer & Feld, LLP

[57] ABSTRACT

A computer system with a SCSI backplane board has duplex-ready logic for switching the computer system between a SCSI simplex mode and a SCSI duplex mode. The duplex-ready logic includes a set of bus quick switches, a duplex-ready logic controller, and a set or sets of active terminators. The SCSI simplex mode and SCSI duplex mode are configured by the duplex-ready logic controller based on the number of SCSI cables present. If only a primary SCSI cable is present, the duplex-ready logic controller enables a SCSI simplex mode. To enable a SCSI simplex mode, the bus switches are enabled and the terminators are selectively enabled and/or disabled. If a primary SCSI cable and a secondary SCSI cable are present, the duplex-ready logic controller enables a SCSI duplex mode. To enable a SCSI duplex mode, the bus switches are disabled and the terminators are selectively disabled and/or enabled. The duplex-ready logic controller optionally may change to SCSI identification values for a set of SCSI devices for a SCSI duplex mode and restore the SCSI identification values for a SCSI simples mode. In manually configuring the state of the SCSI backplane for the secondary SCSI duplex mode, the chassis is minimally disassembled to allow for installation of a SCSI cable from a secondary SCSI controller to the SCSI duplex-ready backplane board. The SCSI duplex-ready backplane board both eliminates the need for a board changeout and a duplex-option kit and reduces the disassembly and reassembly required to configure the state of the SCSI backplane of a computer system for a SCSI simplex mode or a SCSI duplex mode.

51 Claims, 10 Drawing Sheets

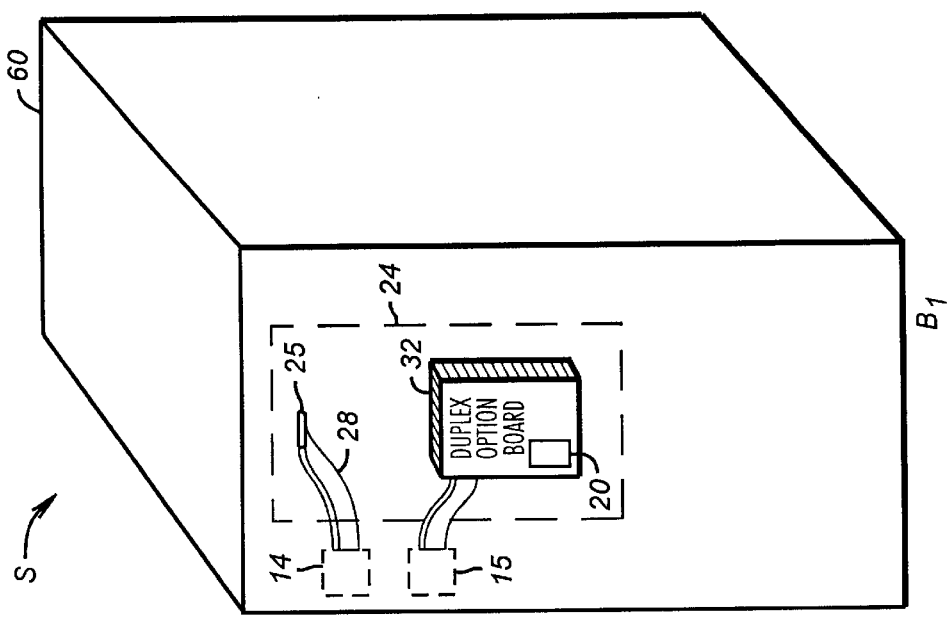
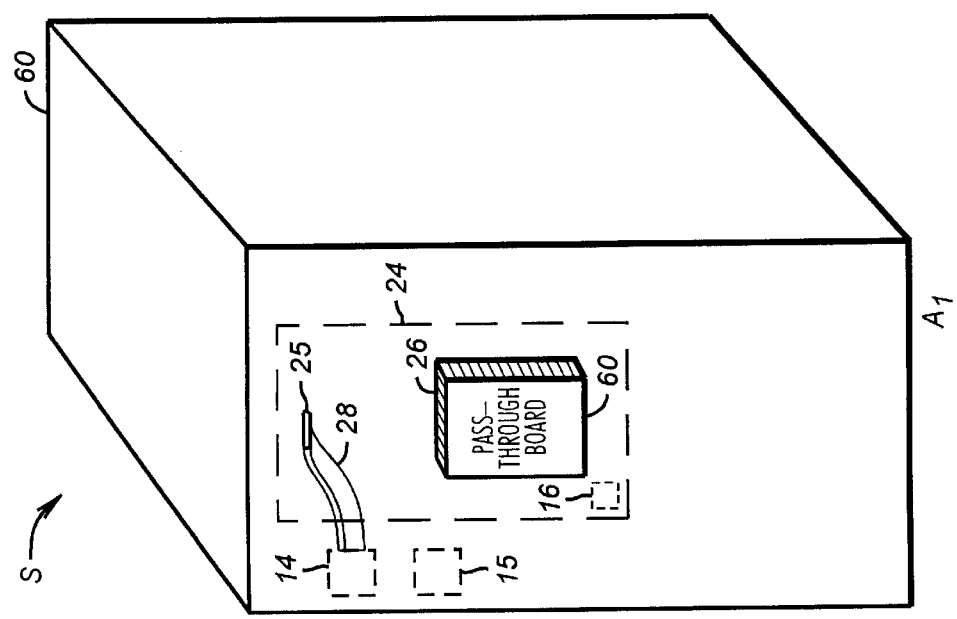
FIG. 3 (PRIOR ART)
FIG. 4 (PRIOR ART)

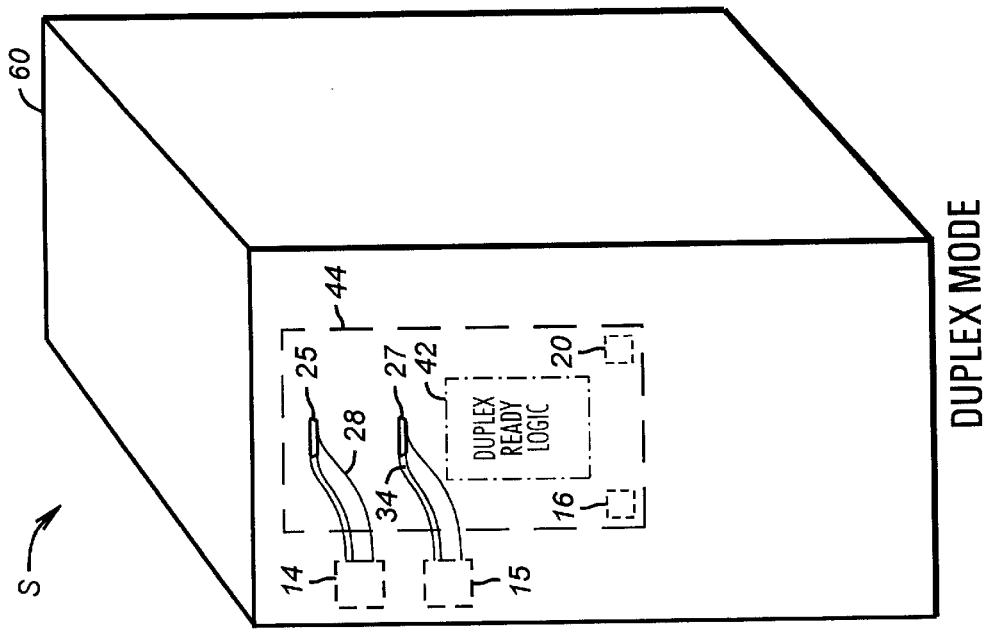
FIG. 8 DUPLEX MODE
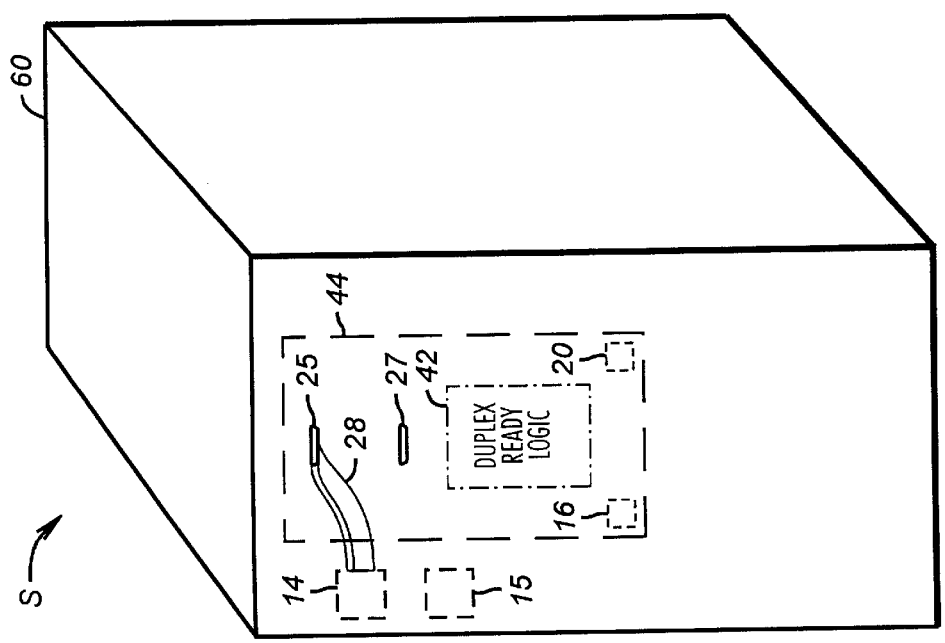
FIG. 7 SIMPLEX MODE

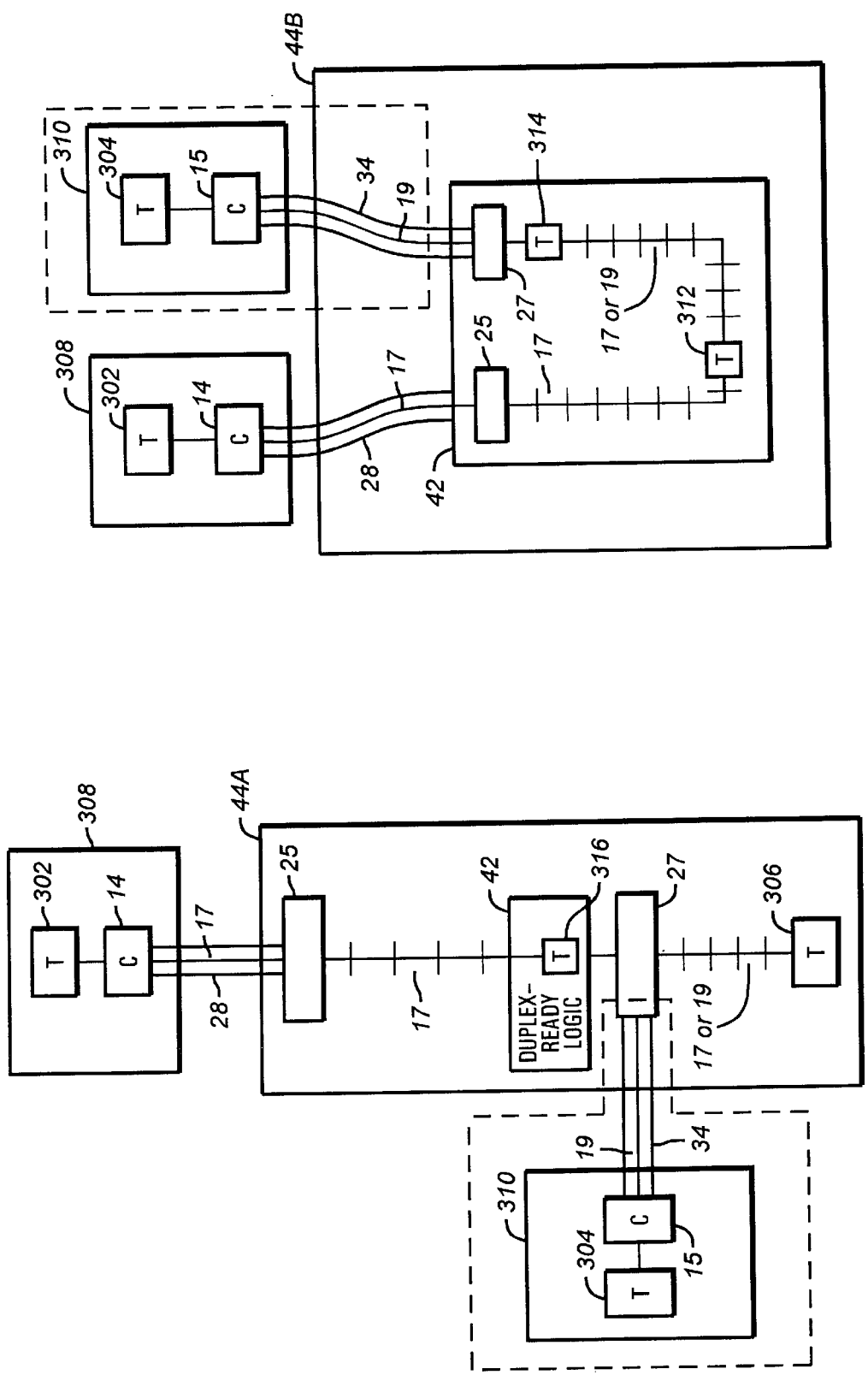

SCSI DUPLEX-READY BACKPLANE FOR SELECTIVELY ENABLING SCSI SIMPLEX AND DUPLEX MODES BASED ON INDICATION OF DESIRED SCSI MODE

BACKGROUND OF THE INVENTION

1. Field of the Invention

The present invention relates to SCSI backplanes of computer systems, and more particularly to a SCSI duplex-ready backplane.

2. Description of the Related Art

SCSI (Small Computer System Interface) has become the best known and most widely used ANSI (American National Standards Institute) interface for computer systems. The goal of SCSI has been to provide reliable connectivity and a flexible, faster command-controlled interface for hard disk drives and other computer peripherals. One way of addressing the need for flexible management of SCSI devices has been upgrading a computer system adapted for a SCSI simplex mode to provide a SCSI duplex mode.

Certain SCSI backplanes or option boards of a computer system have only supported a SCSI simplex mode. In a SCSI simplex mode, a primary SCSI controller controls a single SCSI bus coupled to a set of SCSI devices. Other SCSI backplanes or option boards have supported only a SCSI duplex mode. In a SCSI duplex mode, a primary SCSI controller controls a primary SCSI bus and a secondary SCSI controller controls a secondary SCSI bus.

So far as is known, configuring a computer system from a SCSI simplex mode to a SCSI duplex mode has required a circuit board changeout. This is undesirable in terms of time and skill level required. Some computer systems have used a SCSI simplex-only backplane, or one capable of simplex only, to enable a SCSI simplex mode. A necessary step to re-configure the state of the SCSI backplane of the computer system for a SCSI duplex mode has been to remove the SCSI simplex-only backplane board and replace it with a SCSI duplex-only backplane board.

Other computer systems have used a SCSI pass-through board which connects to the SCSI backplane board to enable a SCSI simplex mode. A necessary step to re-configure the state of the SCSI backplane for a SCSI duplex mode in this case has been to remove the SCSI pass-through board and replace it with a SCSI duplex-option board. Both of the foregoing types of computer systems thus have required a circuit board changeout to configure the state of the SCSI backplane for a SCSI simplex mode or for a SCSI duplex mode.

Configuring the state of the SCSI backplane of a computer system for a SCSI simplex mode to a SCSI duplex mode has also required a significant amount of disassembly and reassembly of the chassis of the computer system. In order to changeout the SCSI pass-through board or SCSI simplex-only backplane board, it has been necessary to at least partially dis-assemble the chassis to reach the backplane. This was necessary to remove the SCSI pass-through board or the SCSI simplex-only backplane board. After the SCSI pass-though board has been replaced with a SCSI duplex-option board or the SCSI simplex-only backplane board has been replaced with a SCSI duplex-only backplane board, the chassis could then be reassembled. When replacing a SCSI simplex-only backplane, it has also been necessary to make cabling changes. For example, it was necessary to remove a cable extending from the first SCSI controller to the SCSI simplex-only backplane board, re-install the cable from the first SCSI controller, and then install a cable extending from the second SCSI controller to the SCSI duplex-only backplane board.

Further, the changeover from simplex to duplex usually required more than mere operator level knowledge. A user is typically required to order a duplex-option kit from the computer vendor, understand the instructions in the kit, and make the necessary disassembly, circuit board changeout, and reassembly to convert the state of the SCSI backplane for a SCSI simplex mode or a SCSI duplex mode. The disassembly, circuit board changeout, and reassembly has generally cost valuable system downtime.

SUMMARY OF THE INVENTION

Briefly, the present invention provides a computer system with a SCSI backplane board having duplex-ready logic for switching the computer system between a SCSI simplex mode and a SCSI duplex mode. The duplex-ready logic includes a set of bus switches, a set of terminators, and a duplex-ready logic controller. The SCSI simplex mode and SCSI duplex mode are configured by the duplex-ready logic controller based on the number of SCSI cables present. If only a primary SCSI cable is present, the duplex-ready logic controller enables a SCSI simplex mode. To enable a SCSI simplex mode, the bus switches are closed and the set or sets of terminators are selectively disabled and/or enabled. A primary SCSI bus and a secondary SCSI bus thereby form a single electrical bus.

If a primary SCSI cable and a secondary SCSI cable are present, the duplex-ready logic controller enables a SCSI duplex mode. To enable a SCSI duplex mode, the bus switches are opened and the terminators are selectively enabled and/or disabled. The primary SCSI bus and secondary SCSI bus thereby are electrically separate busses. The identification values for the SCSI devices associated with the SCSI busses in a SCSI duplex mode may be different than the identification values for the SCSI devices in a SCSI simplex mode. For the SCSI duplex mode, the duplex-ready logic controller optionally changes the SCSI identification values for SCSI devices associated with either SCSI bus to generate unique SCSI identification values.

In manually configuring the state of the SCSI backplane for a SCSI duplex mode, the chassis need only be minimally disassembled to allow for installation of the secondary SCSI cable from a secondary SCSI controller to the SCSI duplex-ready backplane board. Likewise, in manually configuring the state of the SCSI backplane for a SCSI simplex mode, the chassis need only be minimally disassembled to allow for removal of the secondary SCSI cable. The SCSI duplex-ready backplane board both eliminates the need for a board changeout and a duplex-option kit. The present invention thus reduces the disassembly and reassembly required to configure a computer system for a SCSI simplex mode or a SCSI duplex mode.

BRIEF DESCRIPTION OF THE DRAWINGS

A better understanding of the present invention can be obtained when the following detailed description of the preferred embodiment is considered in conjunction with the following drawings, in which:

FIG. 3 is an isometric view of a server with a conventional pass-through board for a SCSI simplex mode;

FIG. 4 is an isometric view of a server with a conventional duplex-option board for a SCSI duplex mode;

FIG. 7 is an isometric view of a server with duplex-ready logic of FIG. 1 in a SCSI simplex mode;

FIG. 8 is an isometric view of a server with duplex-ready logic of FIG. 1 in a SCSI duplex mode;

FIG. 11 is a schematic diagram of an embodiment of the SCSI duplex-ready board of FIGS. 7 and 8 including one set of terminators;

FIG. 12 is a schematic diagram of an embodiment of the SCSI duplex-ready board of FIGS. 7 and 8 including two sets of terminators;

DETAILED DESCRIPTION OF THE PREFERRED EMBODIMENT

The following patent is hereby incorporated by reference:

commonly owned U.S. Pat. No. 5,613,074, entitled "AUTOMATIC DISABLING OF SCSI BUS TERMINATORS," granted Mar. 8, 1997.

Figure 1:
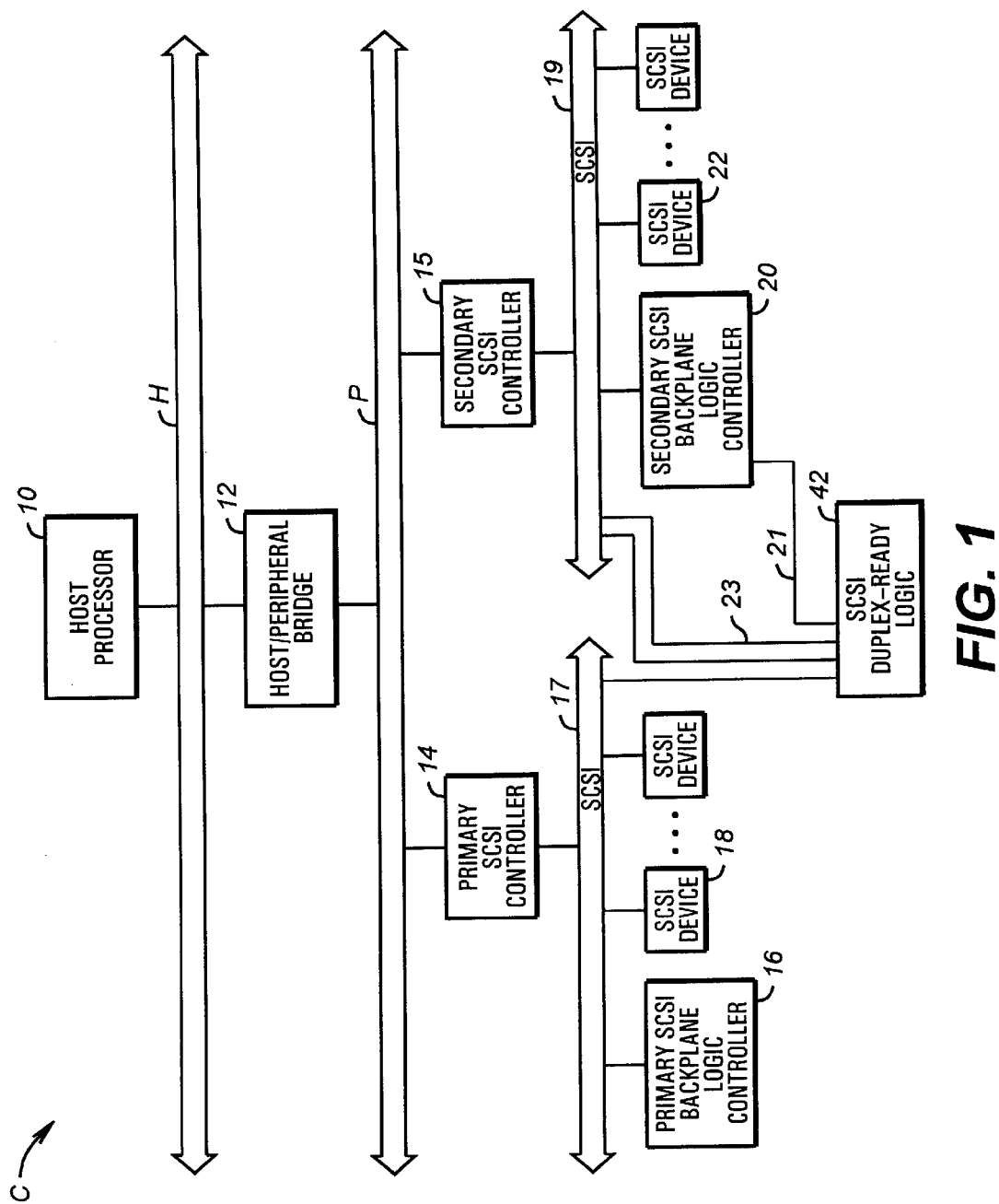
FIG. 1 is a schematic diagram of a computer system including SCSI duplex-ready logic of the present invention.

Turning now to the drawings, FIG. 1 shows a schematic diagram of the computer system C of the present invention. A host/peripheral bridge 12 and a host processor 10 are coupled to a host bus H. It should be understood that more than one host processor 10 may be coupled to the host bus H. The host/peripheral bridge 12 is further coupled to a peripheral bus P. The peripheral bus P may be an ISA (Industrial Standard Architecture) bus, an EISA (Extended Industrial Standard Architecture) bus, a PCI (Peripheral Component Interconnect) bus, or other suitable input/output bus.

The peripheral bus P is coupled to a primary SCSI controller 14 and a secondary SCSI controller 15. The primary SCSI controller 14 serves as a bridge between the peripheral bus P and a primary SCSI bus 17, and the secondary SCSI controller 15 serves as a bridge between the peripheral bus P and a secondary SCSI bus 19. The primary SCSI controller 14 and the secondary SCSI controller 15 are preferably provided on a single electronic component, such as a card, chip, or the like. The primary SCSI bus 17 is coupled to a primary set of SCSI devices 18. Operation of the primary set of SCSI devices 18 is controlled by the primary SCSI controller 14. In accordance with a current SCSI specification, such as the SCSI-2 Specification, the number of SCSI devices in the primary set of SCSI devices 18 may range up to fifteen devices not counting the primary SCSI controller 14. For a particular computer system C the actual number of supported SCSI devices varies depending upon mechanical limitations such as the size of the SCSI devices, the size of the chassis of the computer system, and the number of physical slots or trays within the computer system C for receiving the SCSI devices.

The secondary SCSI bus 19 is coupled to a secondary SCSI controller 15 and a secondary set of SCSI devices 22. In a SCSI duplex mode, operation and control of the secondary set of SCSI devices 22 is controlled by the secondary SCSI controller 15. The secondary SCSI bus 19 also may support up to fifteen SCSI devices not counting the secondary SCSI controller 15. The primary and secondary sets of SCSI devices 18 and 22 may include any type of SCSI device. For example, the SCSI devices for both sets may be all SCSI hard drives or all SCSI CD-ROM drives. As another example, the SCSI devices of the primary set 18 may include SCSI hard drives and the SCSI devices of the second set 22 may include SCSI tape drives for backup. The types of SCSI devices contemplated include, but are not limited to, hard drives, CD-ROM drives, tape drives, scanners, DVD-ROM drives, and DAT drives.

Both the primary SCSI bus 17 and the secondary SCSI bus 19 may be of any SCSI bus type or version. These SCSI bus versions include, but are not limited to, SCSI-2, SCSI-3, Ultra SCSI, Wide SCSI, and Fast SCSI. When the computer system C is a SCSI duplex mode, there is a certain advantage to the primary SCSI bus 17 having a relatively slow SCSI bus version and the secondary SCSI bus 19 having a relatively fast SCSI bus version. In this way, access to a relatively slow SCSI device does not limit the bus speed for access to a relatively fast SCSI device. A SCSI duplex mode also has the advantages of hardware SCSI device mirroring and SCSI device redundancy.

Coupled between the primary SCSI bus 17 and the secondary SCSI bus 19 is a SCSI duplex-ready logic 42 of the present invention. Certain SCSI backplanes of a computer system have supported a SCSI simplex mode. Other SCSI backplanes have supported a SCSI duplex mode. In a SCSI simplex mode, the primary SCSI bus 17 and the secondary SCSI bus 19 constitute one electrical bus. In a SCSI duplex mode, the primary SCSI bus 17 and the secondary SCSI bus 19 are separate electrical busses. Thus, while one SCSI channel is available in a SCSI simplex mode, two independent SCSI channels are available in a SCSI duplex mode.

Configuring the state of the backplane of a computer system for a SCSI simplex mode or a SCSI duplex mode has, as noted above, typically required a complete circuit board changeout. The SCSI duplex-ready logic 42 (FIG. 1, FIG. 7, FIG. 8, FIG. 11, FIG. 12, FIG. 13, and FIG. 14) of the present invention eliminates the need for such a circuit board changeout. Two of the control lines or conductors for signals involved in the operation of the SCSI duplex-ready logic 42 are shown. A secondary SCSI backplane logic controller disable control signal or line 21 is used by the duplex-ready logic 42 in switching to a SCSI simplex mode. Specifically, the SCSI duplex-ready logic 42 sends a status signal or line 21 based on detection of a secondary SCSI cable 34 to the secondary SCSI backplane logic controller 20. A backplane logic controller controls particular management features such as blinking the LEDs for SCSI devices, monitoring the temperature and fans of SCSI devices, monitoring drive status, and providing SCSI mode information to other parts of the computer system C. When the secondary SCSI backplane logic controller 20 is disabled, the primary SCSI backplane logic controller 16 provides these features for the secondary SCSI bus 19.

The SCSI duplex-ready logic 42 may also include a SCSI identification switch 52 (FIGS. 13–14) for providing a secondary SCSI ID control signal or line 23 to change the SCSI identification values for the secondary set of SCSI devices associated with the secondary SCSI bus 19 in switching the computer system C to a different SCSI mode. It should be understood that alternatively the SCSI ID control signal 23 may be coupled to the primary SCSI bus 17 for switching SCSI identification values for the primary set of SCSI devices 18. It should be further understood that setting the SCSI identification values for SCSI devices based on the SCSI mode of the computer system C is an optional feature of the present invention. Such a feature is not needed if the SCSI identification values are defined such that each SCSI identification value for each device or each SCSI bus is unique, regardless of the SCSI mode.

Figure 2:
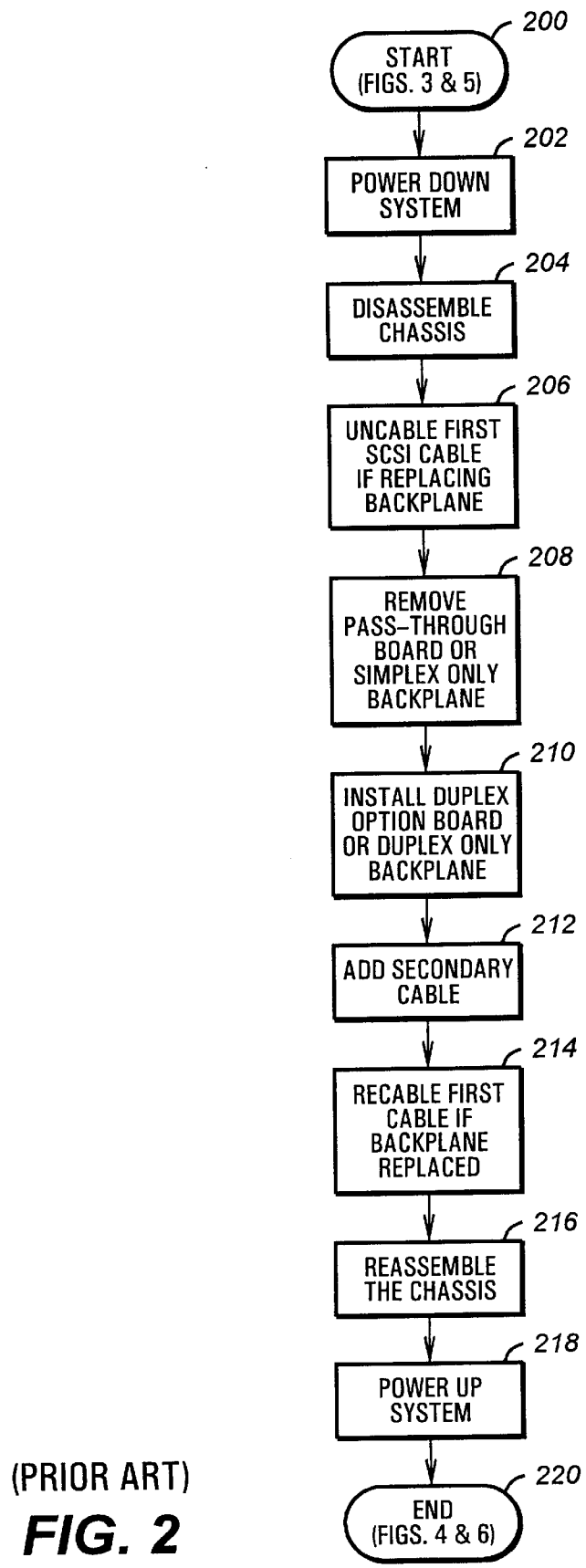
FIG. 2 is a schematic diagram of the sequence of the steps involved in manually configuring the state of the SCSI backplane of a computer system for a SCSI simplex mode or a SCSI duplex mode in accordance with prior art.

Referring to FIG. 2, a sequence of steps involved in manually configuring the state of the backplane of SCSI a computer system for a SCSI duplex mode in accordance with prior art is shown. In step 200, a conventional computer system is in a SCSI simplex mode. Turning to FIG. 3, an isometric view of a server S with a conventional pass-through board for a SCSI simplex mode is shown. The server S includes a SCSI pass-through board 26 typically at the rear of a chassis or housing in a cover or shell 60. The SCSI pass-through board 26 shorts the primary and secondary SCSI busses to form a single physical bus. The server S also includes a primary SCSI cable 28 provided between a primary backplane SCSI connector 25 and the primary SCSI controller 14. Since the server S is in a SCSI simplex mode, no secondary SCSI cable is present between the secondary SCSI controller 15 and the secondary backplane SCSI connector 27. The primary SCSI controller 14 and the secondary SCSI controller 15 are typically located off of the backplane 24, such as on the motherboard of the server S. The primary backplane SCSI connector 25, the secondary backplane SCSI connector 27, the pass-through board 26, and the primary SCSI backplane logic 16 are each usually located in the backplane 24.

Figure 5:
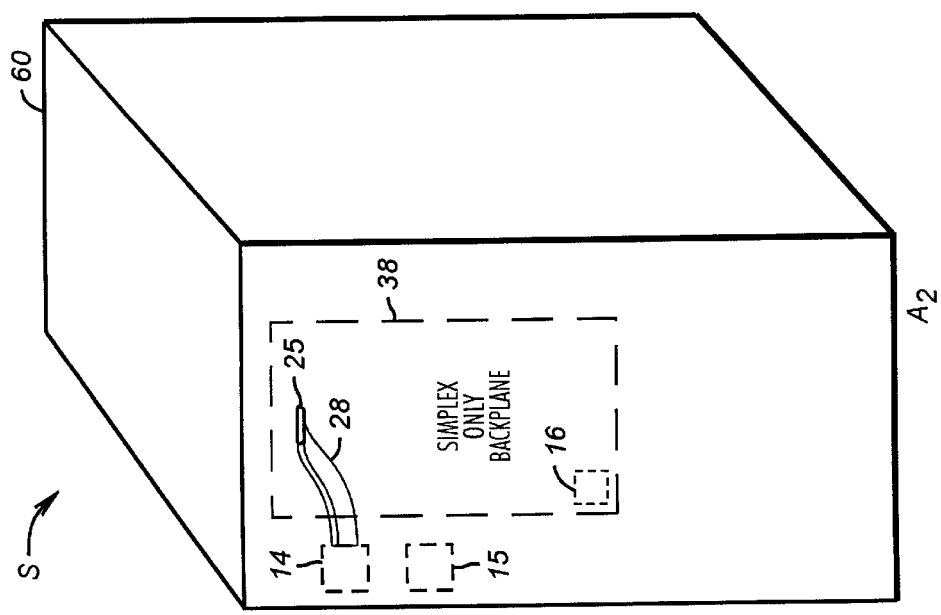
FIG. 5 is an isometric view of a server with a conventional simplex-only backplane for a SCSI simplex mode.

Referring to FIG. 5, another conventional configuration for a server in a SCSI simplex mode is shown. The server S includes a simplex-only backplane 38 instead of a backplane 24 with a pass-through board 26 as shown in FIG. 3. The backplane 38 includes a primary SCSI backplane logic controller 16 and a primary backplane SCSI connector 25. The primary SCSI controller 14 is typically located off of the backplane 38. A primary backplane SCSI cable 28 therefore is used to connect the primary SCSI controller 14 to the primary SCSI connector 25. In addition, a secondary SCSI controller 15 is typically located off the backplane 38.

Figure 6:
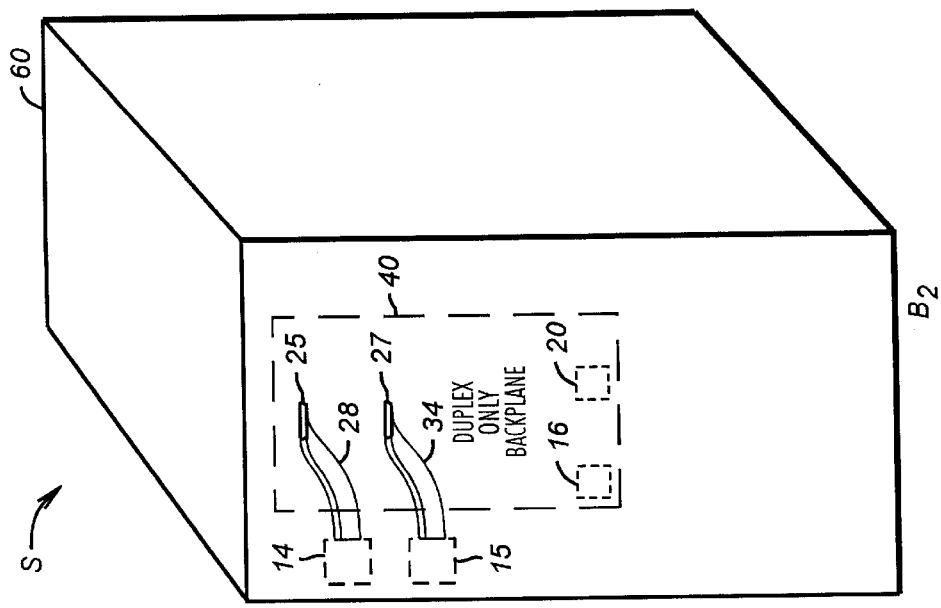
FIG. 6 is an isometric view of a server with a conventional duplex-only backplane for a SCSI duplex mode.

Returning to FIG. 2, in step 202, the computer system is powered down for reconfiguration of SCSI modes. The computer system must be unpowered for a user to work at the backplane of the computer system. Next, in step 204, the chassis of the computer system is disassembled. It has been necessary for a user to perform a significant amount of disassembly so that a user is able to reach and changeout a circuit board at the backplane. In step 206, the user then uncables the primary SCSI cable 28 if the entire SCSI backplane is being replaced. Next in accordance with step 208, the pass-through board 26 (FIG. 3) or the simplex-only backplane 38 (FIG. 5), depending on whichever board is used in the conventional computer system, is removed by the user. The next step indicated as step 210 is for the user to install a duplex option board 32 (FIG. 4) or a duplex-only backplane 40 (FIG. 6) again depending upon the type of conventional computer system. The duplex option board 32 includes the secondary SCSI backplane logic controller 20. The duplex-only backplane 40 includes the secondary SCSI backplane logic controller 20 and the primary SCSI backplane logic controller 16. It is then necessary in step 212 for the user to add a secondary SCSI cable 34. If a duplex option board 32 is being used, the secondary SCSI cable 34 is provided between the secondary SCSI controller 15 and the secondary SCSI connector 27 on the duplex-option board 32 (FIG. 4). If the duplex-only backplane 40 is being used, the secondary SCSI cable 34 is provided between the secondary SCSI controller 15 and the secondary SCSI connector 27 on the duplex-only backplane 40 (FIG. 6). Next, in step 214, if the entire SCSI backplane was replaced, the primary SCSI cable 28 is recabled to the added backplane. With the circuit board changeout and recabling complete, the user then in step 216 may reassemble the chassis and next power up the computer system in step 218. The end product of this manual configuring process for the SCSI backplane is a conventional computer system now re-configured for a SCSI duplex mode. As can be seen, this is not a simple changeover for an ordinary computer user.

Referring to FIG. 7, a server S of the present invention configured for a SCSI simplex mode including the duplex-ready logic 42 is shown. It should be understood that the server S may be of any type. The present invention server includes a duplex-ready backplane 44 on which duplex-ready logic 42 is mounted. The duplex-ready logic 42 of the backplane 44 enables either a SCSI simplex mode or a SCSI duplex mode based on the state of the backplane 44. Among other components to be described below, the duplex-ready logic 42 includes the secondary SCSI bus logic controller 20. In addition to the duplex-ready logic 42, the duplex-ready backplane 44 includes the primary SCSI logic controller 16, the primary SCSI connector 25, and the secondary SCSI connector 27.

The duplex-ready SCSI backplane 44 of the present invention differs significantly from a conventional duplex-only backplane 40 and a conventional simplex-only backplane 38. A duplex-only backplane 40 only allows for a SCSI duplex mode and a simplex only backplane 38 only allows for a SCSI simplex mode. Therefore, as detailed above, a circuit board changeout is necessary to switch to a different SCSI mode. The duplex-ready backplane 44 of the present invention, however, allows for both a SCSI duplex mode and a SCSI simplex mode. As a result, a user is not required to make a circuit board changeout to switch or reconfigure between a SCSI simplex mode and a SCSI duplex mode. Similarly, a conventional backplane 24 coupled to a pass-through board 26 (FIG. 3) only supports a SCSI simplex mode and a conventional backplane 24 coupled to a duplex option board 32 (FIG. 4) only supports a SCSI duplex mode. This conventional backplane 24 has the further disadvantage of requiring two circuit boards to configure a SCSI backplane for a SCSI simplex mode or a SCSI duplex mode. With multiple circuit boards, the impedance of the boards has had to be matched to maintain data integrity. The duplex-ready SCSI backplane board 44 of the present invention, being a single circuit board, eliminates the need for impedance matching of multiple circuit boards for a SCSI duplex mode or a SCSI simplex mode.

Figures 9, 10:
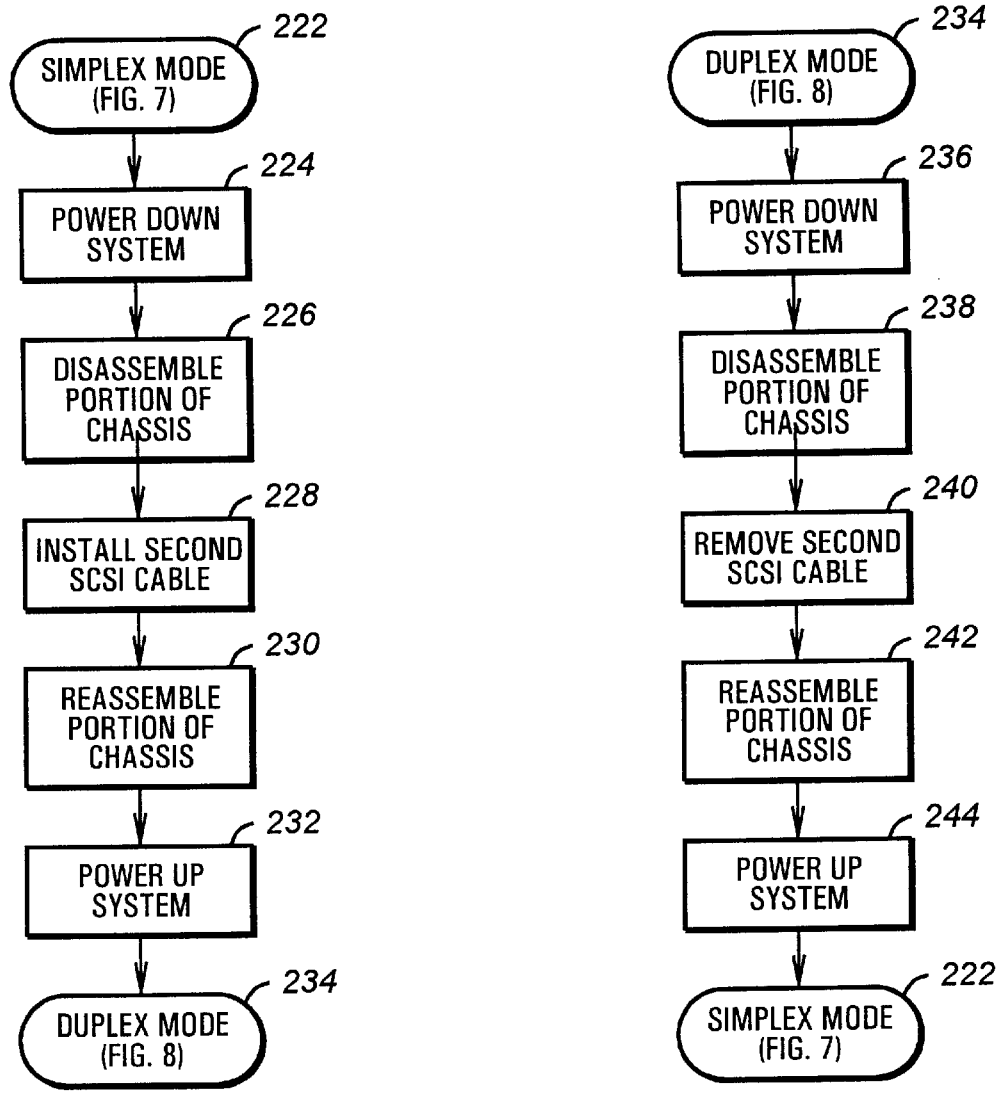
FIG. 9 is a schematic diagram of the sequence of steps involved in configuring the state of the backplane of the computer system for a SCSI duplex mode.
FIG. 10 is a schematic diagram of the sequence of steps involved in configuring the state of the backplane of the computer system for a SCSI simplex mode.

Referring to FIG. 8, the server S of the present invention in a configured SCSI duplex mode is shown. The only manual configuration difference external to the duplex-ready logic board 42 in a duplex-ready backplane 44 between a SCSI duplex mode and a SCSI simplex mode is the addition of a second SCSI cable 34 between the secondary SCSI connector 27 and the secondary SCSI controller 15 for the SCSI duplex mode. Referring to FIG. 9, the easy manual process for a user to configure the state of the duplex-ready backplane 44 of the computer system C in a SCSI simplex mode for a SCSI duplex mode is shown. Step 222 represents a SCSI simplex mode of a server as shown in FIG. 7. In step 224, the user powers down the computer system C. Next, in step 226, the user disassembles a portion, usually the shell or cover 60, of the chassis of the computer system C. The partial disassembly in this step is less than the disassembly of the chassis required in conventional computer systems. In conventional systems, the chassis must be disassembled to the point that the user is able to changeout a circuit board at the backplane. In the present invention, however, the chassis need only be disassembled to a point allowing the user to install the secondary SCSI cable 34.

In step 228, the installation of the secondary SCSI cable 34 is made. In step 230, the portion of the chassis, usually only the shell 60, which was disassembled is reassembled. In a conventional computer system, it would be necessary to also change out a circuit board. Also, if the entire backplane is being replaced, it would further be necessary to reinstall the primary SCSI cable 25. Lastly, in step 232, the user powers up the computer system C. At this point, the manual process for configuring the state of the duplex-ready backplane 44 for the computer system C to a SCSI duplex mode is complete. The end product for the server S is shown in FIG. 8. The remaining functions necessary to enable the SCSI duplex mode of the computer system S are performed, as described below, by the SCSI duplex-ready logic 42 electronically based on the state of the duplex-ready backplane 44.

Configuring the computer system S of the present invention in a SCSI duplex mode for a SCSI simplex mode is also easier than in a conventional computer system. The sequence of steps involved in configuring the state of the duplex-ready backplane 44 for a SCSI simplex mode is shown in FIG. 10. Step 234 represents the SCSI duplex mode of the computer system C. In step 236, the computer system C is powered down. Next, in step 238, a portion of the chassis of the computer system C is disassembled, again usually only requiring removal of the cover 60. The chassis is only disassembled to a degree which allows the user to remove the secondary SCSI cable 34. The secondary SCSI cable 34 is removed in step 240. The user then in step 242 reassembles the portion of the chassis which was disassembled. Lastly, in step 244, the computer system C is repowered. In a conventional computer system it would not only be necessary to remove the secondary SCSI cable 34, but it would also be necessary to remove either the duplex option board 32 or the duplex-only backplane 40. If the duplex option board 32 is being removed, the board 32 would be replaced by a pass-through backplane board 26. If a duplex-only backplane 40 is being removed, the board 40 would be replaced by a simplex-only backplane board 38. Thus, a conventional computer system would require a complete circuit board changeout to reconfigure the state of a SCSI backplane.

Referring to FIG. 11, an embodiment of the duplex-ready board 44A including a duplex-ready logic 42 having a single set of terminators 316 is shown. A requirement of a SCSI bus is that it be terminated at both ends to preserve signal integrity. When a terminator is enabled, the terminator provides termination for a bus. When a terminator is disabled, a terminator does not provide termination for a bus. Further details concerning termination of a SCSI bus may be obtained from commonly-owned U.S. Pat. No. 5,613,074, granted Mar. 8, 1997, entitled "AUTOMATIC DISABLING OF SCSI BUS TERMINATORS," which is herein incorporated by reference. In a SCSI simplex mode, the set of terminators 316 is disabled. With the set of terminators 316 disabled, the primary SCSI bus 300 as the single physical bus extends or runs from a set of terminators 302 associated with the primary SCSI controller 14 to a set of terminators 306 located on the duplex-ready board 44A and off the duplex-ready logic 42. The primary SCSI controller 14 is coupled to the duplex-ready board 44 through the primary backplane SCSI connector 25. The primary SCSI controller 14 and the associated set of terminators 302 are preferably located on a motherboard 308 of the computer system C.

In a SCSI duplex mode, the set of terminators 316 is enabled. With the set of terminators 316 enabled, the primary SCSI bus 17 extends or runs from the set of terminators 302 to the set of the terminators 316 instead of to the set of terminators 306. The secondary SCSI bus 19 extends or runs from the set of terminators 304 associated with the secondary SCSI controller 15 to the set of terminators 306. The secondary SCSI controller 15 is coupled to the duplex-ready board 44 through the secondary backplane SCSI connector 27. The secondary SCSI controller 15 and the associated set of terminators 304 may be located on a plug-in card 310 as shown or on the motherboard 308. The plug-in card 310 and the secondary cable 34 are enclosed in broken line to indicate that the secondary SCSI controller 15 and secondary cable 34 are only attached to the duplex-ready board 42 in a SCSI duplex mode.

Referring to FIG. 12, an alternative embodiment of the duplex-ready board 44B including three sets of terminators 312, 313, and 314 is shown. In a SCSI simplex mode, the set of terminators 312 is disabled, the set of terminators 313 is disabled, and the set of terminators 314 is enabled. This configuration of the sets of terminators 312, 313, and 314 results in a single physical bus extending or running from the set of terminators 302 associated with the primary SCSI controller 14 to the set of terminators 314. The primary SCSI controller 14 is coupled to the duplex-ready board 44 through primary backplane SCSI connector 25. In a SCSI duplex mode, the set of terminators 312 is enabled, the set of terminators 313 is enabled, and the set of terminators 314 is disabled. The primary SCSI bus 17 extends or runs from the set of terminators 302 to the set of terminators 312. The secondary bus 19 extends or runs from the set of terminators 304 associated with secondary SCSI controller 15 to the set of terminators 313. The secondary SCSI controller 15 and the associated set of terminators 304 are housed on a plug-in card 310 coupled to the duplex-ready board 44B through a secondary backplane SCSI connector 27. While the embodiment of the duplex-ready logic 42 of FIG. 11 provides a single set of terminators 42, the duplex-ready logic 42 of FIG. 12 provides two sets of terminators 312 and 314. It should be understood that additional embodiments of the duplex-ready board 44 are possible.

Figure 13:
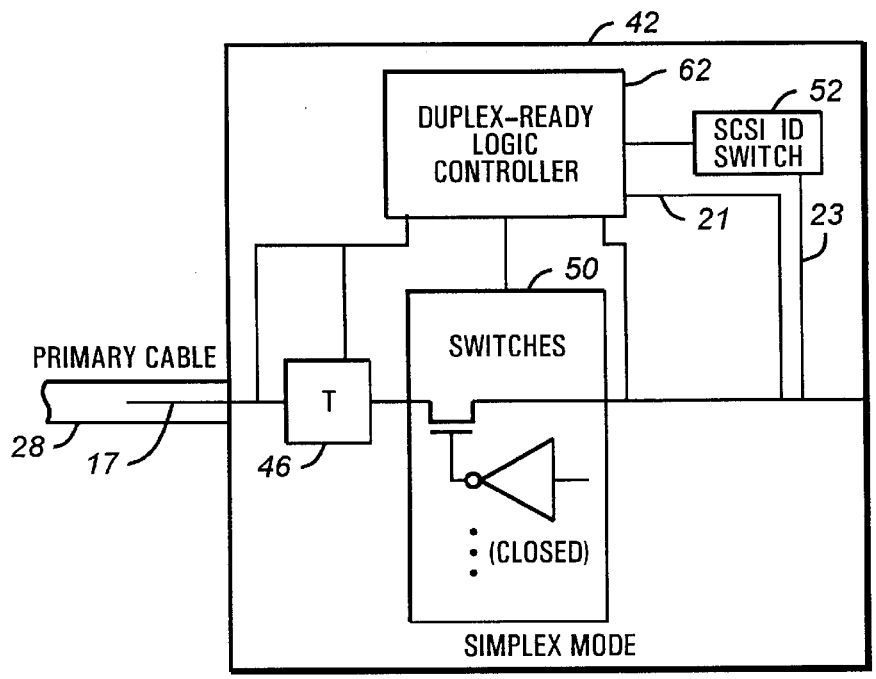
FIG. 13 is a schematic diagram of the SCSI duplex-ready logic of FIG. 1 in a SCSI simplex mode.

Referring to FIG. 13, the portions of duplex-ready SCSI logic 42 used for a SCSI simplex mode are shown. The duplex-ready logic 42 includes a set of bus switches 50 and a duplex-ready logic controller 62. The duplex-ready logic 42 also includes a set or sets of terminators 46 depending on the embodiment of the duplex-ready board 44. Each bus switch 50 is an electronic bidirectional switch having a low load. Due to its low load, the bus switch 50 is well behaved and minimally intrusive to the SCSI busses. An example of a bus switch 50 is of the type sold by Quality Semiconductor, Inc. under the trademark Quick Switch®. For a SCSI simplex mode, the bus switches 50 are in a closed state. In addition, in a SCSI simplex mode, the secondary SCSI backplane logic controller 20 is disabled by asserting a disable signal 21. With the set or sets of terminators 46 selectively disabled and/or enabled and the bus switches 50 in an closed state, the primary SCSI bus 17 and the secondary SCSI bus 19 are joined as a single electrical bus.

Figure 14:
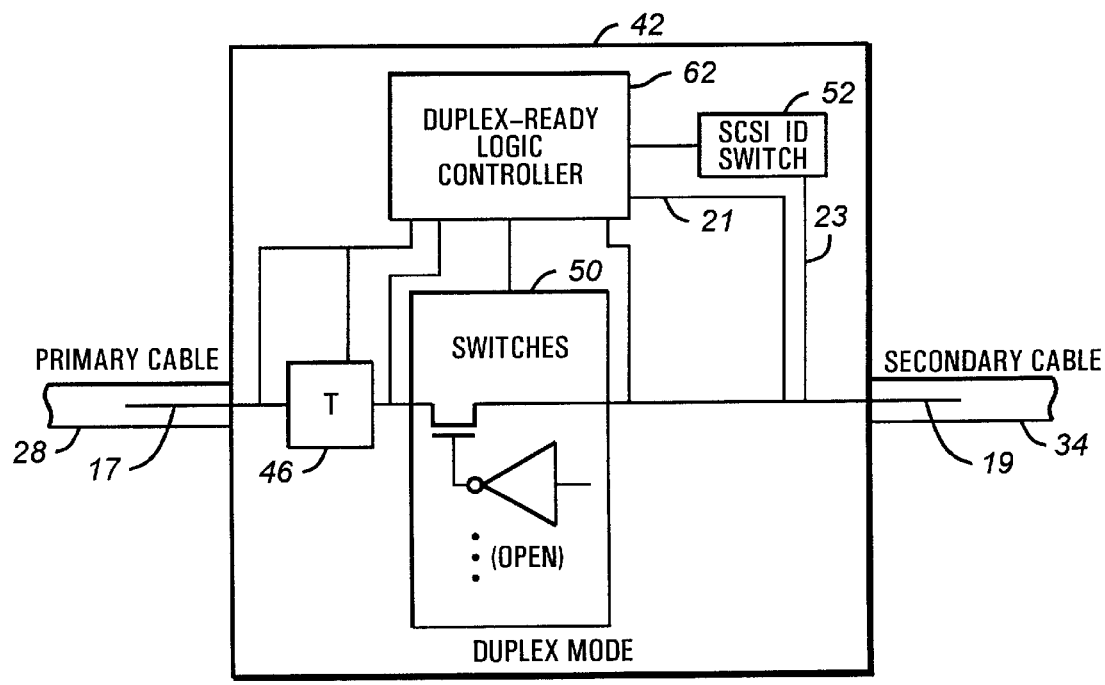
FIG. 14 is a schematic diagram of the SCSI duplex-ready logic of FIG. 1 in a SCSI duplex mode.

Referring to FIG. 14, the portions of duplex-ready logic 42 for a SCSI duplex mode are shown. Since the secondary SCSI bus 19 is an independent bus in a SCSI duplex mode, the secondary SCSI backplane logic controller 20 is enabled for the SCSI duplex mode. Also, in the SCSI duplex mode, the bus switches 50 are in an open state allowing for the primary SCSI bus 17 to be physically and electrically separate from the secondary SCSI bus 19. The duplex-ready logic 42 optionally may include the SCSI ID switch 52 responsive to SCSI cable detection by the duplex logic controller 62 for providing a SCSI control signal 23 to change or restore SCSI identification values for SCSI devices.

Figure 15:
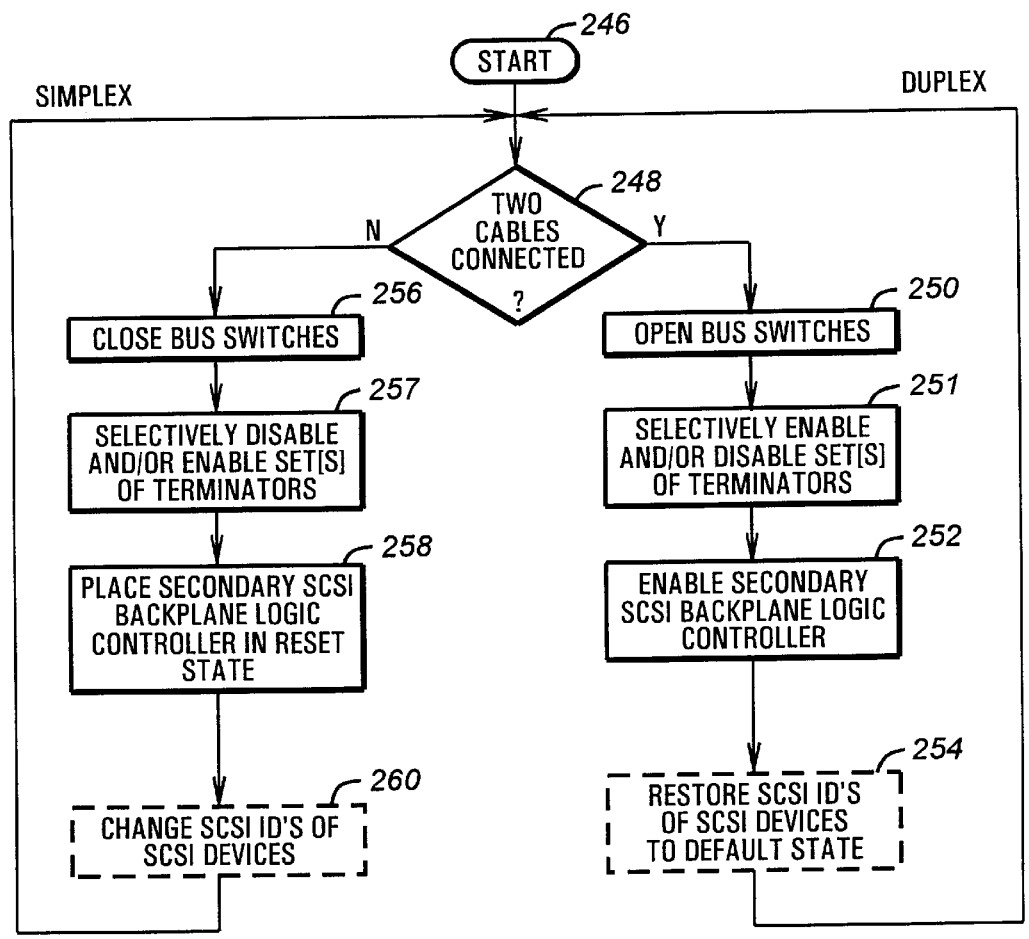
FIG. 15 is a flow chart of the electronic enabling process of the present invention executed by the SCSI duplex-ready logic controller of FIGS. 13 and 14, for switching a computer system between a SCSI simplex mode and a SCSI duplex mode.

Referring to FIG. 15, the electronic operations performed by the SCSI duplex-ready logic controller 62 of the duplex-ready logic for enabling a SCSI simplex mode or a SCSI duplex mode are shown. The duplex-ready logic controller 62 may be implemented as a programmable logic array (PLA). Design and operation of a programmable logic array is understood in the art. The duplex-ready logic controller 62 enables either a SCSI simplex mode or a SCSI duplex mode depending on the state of the SCSI duplex-ready backplane 44. That is, in step 248, it is detected whether the primary SCSI cable 28 and a secondary SCSI cable 34 are connected to the SCSI duplex-ready backplane 44. If only the primary SCSI cable 28 is connected to the backplane 44, the duplex-ready controller 62 proceeds to enable a SCSI simplex mode. In step 256, the bus switches 50 of the duplex-ready logic 42 are placed in a closed state. If the bus switches 50 are in a closed state, the primary SCSI bus 17 and the secondary SCSI bus 19 are coupled. Next, in step 257, the set or sets terminators 46 provided are selectively disabled and/or enabled. Whether a particular set of terminators 46 is disabled or enabled depends on the particular embodiment of the duplex-ready board 44. With the bus switches 50 in a closed state and the terminators 46 and 48 selectively disabled and/or enabled, the primary SCSI bus 17 and the secondary SCSI bus 19 are joined as one electrical bus.

Next, in step 258, the duplex-ready logic controller 62 places the secondary SCSI backplane logic controller 20 in a reset state. With the secondary SCSI backplane logic controller 20 in a reset state, the primary SCSI backplane logic controller 16 controls the management features of the single physical bus. Next, in step 260, the primary SCSI backplane logic controller 16 changes the SCSI identification (ID) values or codes of the secondary set of SCSI devices 22 connected to the secondary SCSI bus 19. Referring to FIG. 14, the SCSI ID codes for the primary and secondary set of SCSI devices 18 and 22 in a SCSI simplex mode are shown. In a computer system C having seven SCSI devices in total, the devices may for example be identified with ID codes from 0 to 6. Step 260 is shown in broken line to indicate that the step is optional. It should be understood that steps 256 through 260 may occur in any order. From step 260, control returns to step 248 where the duplex-ready logic 42 again detects the state of the duplex-ready backplane 44. Since this detection of the state of the duplex-ready backplane 14 is continuous, the detection is initially made when a computer system C is powered.

In step 248, if a primary SCSI cable 28 and a secondary SCSI cable 34 are both detected as being connected to the SCSI duplex-ready backplane 44, the duplex-ready logic controller 62 proceeds to enable a SCSI duplex mode for the computer system C. In step 260, the bus switches 50 are placed in an open state by the duplex-ready logic controller 62. When the bus switches 50 are an open state, the primary SCSI bus 17 and the secondary SCSI bus are decoupled. Then, in step 251, the duplex-ready logic controller 62 selectively enables and/or disables the set or sets terminators 46. As previously noted, whether a particular set of terminators is enabled or disabled depends on the particular embodiment of the duplex-ready board 44. With the bus switches 50 in an open state and the set or sets terminators 46 selectively enabled and/or disabled, the end of the primary SCSI bus 17 coupled to the duplex-ready logic 42 is terminated and the end of the secondary SCSI bus 19 coupled to the duplex-ready logic 42 is also terminated. Each SCSI bus as a result is a separate electrical bus. Next, in step 252, the secondary SCSI backplane logic controller 20 is enabled by the duplex-ready logic controller 62. In this way, the secondary SCSI backplane logic controller 20 controls the secondary SCSI bus 19 independent of the primary SCSI backplane logic controller 16.

Figure 16:
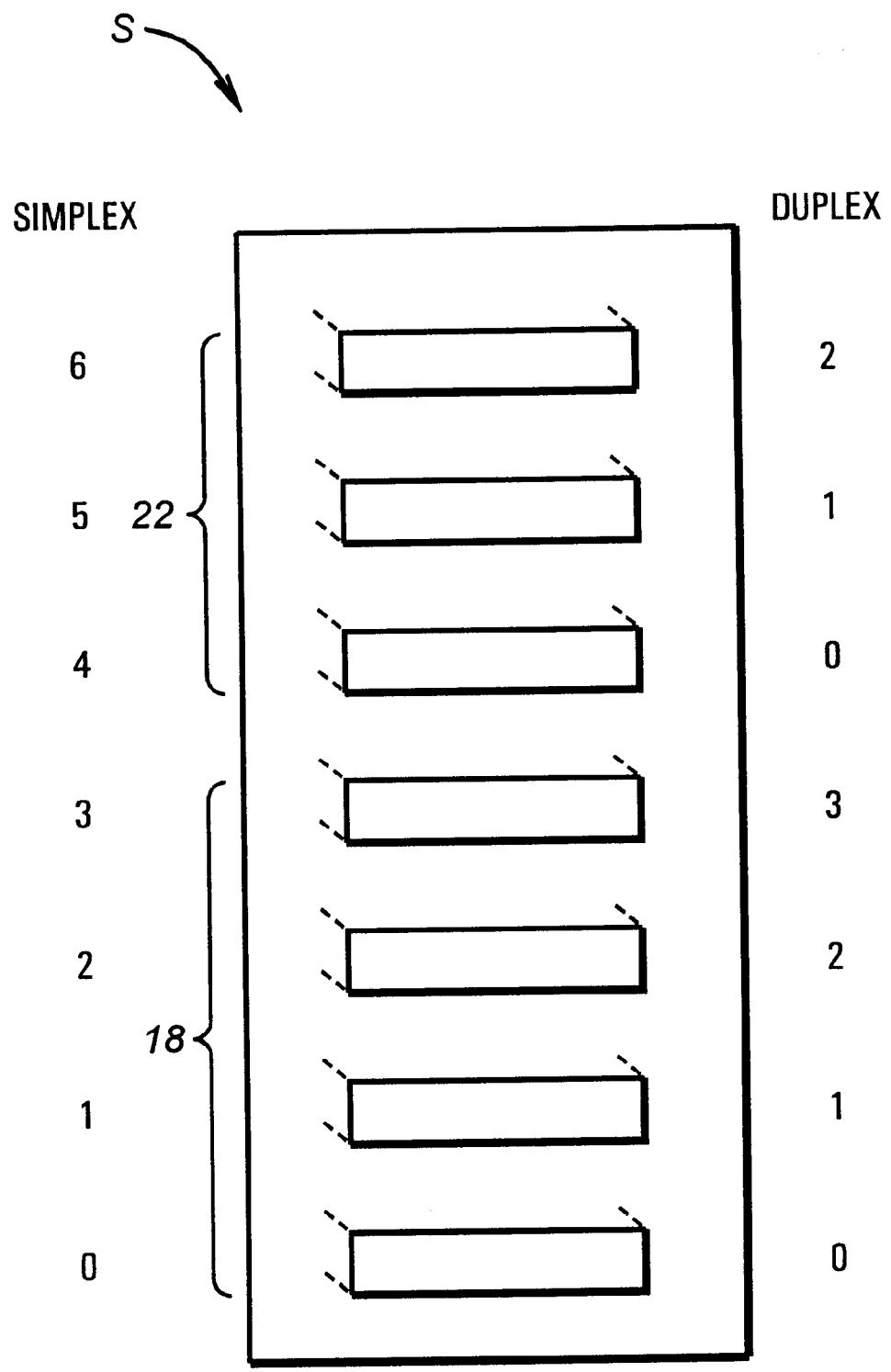
FIG. 16 is an illustration of exemplary SCSI identification values for the SCSI devices for the server of FIGS. 7 and 8.

Control then proceeds to step 254 in which the primary SCSI backplane logic controller 16 restores the SCSI ID codes for the devices 22 of the secondary SCSI bus 19 to a default state. In this default state, the primary set of SCSI devices 18 have identification values beginning at 0 and the secondary set of SCSI devices 22 also have identification values beginning with 0. For example, where a primary set of SCSI devices 18 provides four SCSI devices and the secondary set of SCSI devices 22 provides three SCSI devices as illustrated in FIG. 16, the primary set of SCSI devices may be numbered between 0 and 3 and the secondary set of SCSI devices may be numbered between 0 and 2. Step 254 is shown in broken line to indicate that the step is optional. It should be understood that steps 250 through 254 may occur in any order. From step 254, control returns to step 258 where the state of duplex-ready backplane 44 is again detected.

Thus, a computer system C is provided with a SCSI backplane board 44 having duplex-ready logic 42 for switching the computer system C between a SCSI simplex mode and a SCSI duplex mode without the need for a board changeout or a duplex option kit. The duplex-ready logic includes a set of bus switches 50, a set or set of terminators 46, and a duplex-ready logic controller 62. The SCSI simplex mode and SCSI duplex mode are configured by the duplex-ready logic 42 based on the number of SCSI cables present. If only a primary SCSI cable 28 is present, the duplex-ready logic controller 62 enables a SCSI simplex mode. To enable a SCSI simplex mode, the bus switches 50 are closed, the set of terminators 46 are selectively are disabled and/or enabled, and the secondary SCSI backplane logic controller 20 for the secondary SCSI bus 19 is placed in a reset state. As a result, the primary SCSI bus 17 and the secondary SCSI bus 19 are joined as one electrical bus.

If a primary cable SCSI cable 28 and a secondary SCSI cable 34 are present, the duplex-ready logic controller 62 enables a SCSI duplex mode. To enable a SCSI duplex mode, the bus switches 50 are opened, the set or sets terminators 46 are selectively enabled and/or disabled, and the secondary SCSI backplane logic controller 20 for the secondary SCSI bus 18 is enabled. As a result, the primary SCSI bus 17 and the secondary SCSI bus 19 are split into independent busses. Although the SCSI backplane board 44 of the present invention is described as supporting either a SCSI simplex mode (one SCSI bus) or a SCSI duplex mode (two SCSI busses), it is contemplated that the SCSI backplane board 44 may support other SCSI modes defined by splitting or joining a plurality of SCSI busses based on the state of the SCSI backplane 44.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system adapted for selectively enabling a SCSI simplex mode and a SCSI duplex mode based on an indication of a desired SCSI mode, comprising:
    a processor;
    a primary SCSI controller coupled to said processor;
    a primary SCSI bus coupled to said primary SCSI controller;
    a primary set of SCSI devices coupled to said primary SCSI bus;
    a secondary SCSI controller coupled to said processor;
    a secondary SCSI bus coupled to said secondary SCSI controller;
    a secondary set of SCSI devices coupled to said secondary SCI bus in the SCSI duplex mode and coupled to said primary SCSI bus in the SCSI simplex mode; and
    a duplex-ready SCSI backplane board coupled to said primary SCSI controller, said secondary SCSI controller, said primary SCSI bus, and said secondary SCSI bus, comprising:
        SCSI duplex-ready logic for selectively enabling the SCSI simplex mode and the SCSI duplex mode;
        said SCSI duplex-ready logic joining said primary SCSI bus and said secondary SCSI bus as one electrical bus in the SCSI simplex mode; and
        said SCSI duplex-ready logic separating said primary SCSI bus and said secondary SCSI bus into independent electrical busses in the SCSI duplex mode.

2. The computer system of claim 1, further comprising:
    a primary SCSI cable coupled between said primary SCSI controller and said SCSI duplex-ready logic in the SCSI simplex mode and the SCSI duplex mode, said primary SCSI cable carrying said primary SCSI bus.

3. The computer system of claim 1, further comprising:
    a secondary SCSI cable coupled between said secondary SCSI controller and said SCSI duplex-ready logic in the SCSI duplex mode, said secondary SCSI cable carrying said secondary SCSI bus.

4. The computer system of claim 1, said SCSI duplex-ready logic comprising:
    a plurality of bus switches for coupling said primary SCSI bus and said secondary SCSI bus in the SCSI simplex mode and decoupling said primary SCSI bus and said secondary SCSI bus in the SCSI duplex mode.

5. The computer system of claim 4, wherein the state of said duplex-ready SCSI backplane provides an indication of the desired SCSI mode.

6. The computer system of claim 4, wherein said plurality of bus switches are in a closed state for the SCSI simplex mode and in an open state for the SCSI duplex mode.

7. The computer system of claim 6, wherein said primary SCSI bus and said secondary SCSI bus are joined into a single electrical bus when said plurality of bus switches are in a closed state.

8. The computer system of claim 6, wherein said primary SCSI bus and said secondary SCSI bus are split into independent electrical busses when said plurality of bus switches are in an open state.

9. The computer system of claim 1, said SCSI duplex-ready logic comprising:
    a set of terminators for actively terminating said primary SCSI bus in the SCSI duplex mode.

10. The computer system of claim 9, wherein said set of terminators are enabled during the SCSI duplex mode and disabled during the SCSI simplex mode.

11. The computer system of claim 1, said SCSI duplex-ready logic comprising:
    a first set of terminators for actively terminating said primary SCSI bus and said secondary SCSI bus in the SCSI duplex mode; and
    a second set of terminators for actively terminating said primary SCSI bus in the SCSI simplex mode.

12. The computer system of claim 11, wherein said first set of terminators are enabled in a SCSI duplex mode and said second set of terminators are enabled in a SCSI simplex mode.

13. The computer system of claim 1, and SCSI duplex-ready board comprising:
    a set of terminators for actively terminating said secondary SCSI bus in the SCSI duplex mode.

14. The computer system of claim 13, wherein said set of terminators is enabled in the SCSI duplex mode and disabled in the SCSI simplex mode.

15. The computer system of claim 1, said duplex-ready SCSI backplane board further comprising:
    a secondary SCSI backplane logic controller for providing management features for said secondary set of SCSI devices when the computer system is in the SCSI duplex mode.

16. The computer system of claim 1, wherein said computer system is a server.

17. The computer system of claim 1, said SCSI duplex-ready logic comprising:
    a SCSI duplex-ready logic controller for selectively enabling a SCSI simplex mode and a SCSI duplex mode.

18. The computer system of claim 17, wherein the SCSI duplex-ready logic controller is a programmable logic array.

19. The computer system of claim 1, further comprising:
    a secondary SCSI backplane logic controller disable signal provided by said duplex-ready logic to said secondary SCSI backplane logic controller to disable said secondary a SCSI backplane logic controller for the SCSI simplex mode.

20. The computer system of claim 1, further comprising:
    a secondary SCSI ID control signal provided by said SCSI duplex-ready logic to a SCSI bus to change the SCSI identification values for a set of SCSI devices if the computer system is a SCSI duplex-ready mode and to restore the SCSI identification values for a set of SCSI devices if the computer system is in a SCSI simplex mode.

21. The computer system of claim 1, wherein said primary SCSI bus is a relatively fast bus and the secondary SCSI bus is a relatively slow bus.

22. The computer system of claim 21, wherein said primary set of SCSI devices are hard drives and said secondary set of SCSI devices are tape drives.

23. The computer system of claim 21, wherein said primary set of SCSI devices and said secondary set of SCSI devices are CD-ROM drives.

24. The computer system of claim 21, wherein said primary set of SCSI devices and said secondary set of SCSI devices are hard drives.

25. The computer system of claim 1, wherein said primary SCSI controller and said secondary SCSI controller are provided on a single electrical component.

26. A duplex-ready SCSI backplane board of a computer system for enabling a SCSI simplex mode and a SCSI duplex mode, the duplex-ready SCSI backplane board being coupled to a primary SCSI bus and a secondary SCSI bus, comprising:

SCSI duplex-ready logic coupled between the primary SCSI bus and the secondary SCSI bus for enabling the SCSI simplex mode and the SCSI duplex mode;

said SCSI duplex-ready logic joining said primary SCSI bus and said secondary SCSI bus as one electrical bus in the SCSI simplex mode;

said SCSI duplex-ready logic separating said primary SCSI bus and said secondary SCSI bus into independent electrical busses in the SCSI duplex mode.

27. The duplex-ready SCSI backplane board of claim 26, wherein said board is coupled to a primary SCSI cable in the SCSI simplex mode and the SCSI duplex mode, said primary SCSI cable carrying the primary SCSI bus.

28. The duplex-ready SCSI backplane board of claim 26, wherein said board is coupled to a secondary SCSI cable in the SCSI duplex mode, said secondary SCSI cable carrying the secondary SCSI bus.

29. The duplex-ready SCSI backplane board of claim 26, said duplex-ready logic comprising:

a plurality of bus switches for coupling said primary SCSI bus and said secondary SCSI bus in the SCSI simplex mode and decoupling said primary SCSI bus and said secondary SCSI bus in the SCSI duplex mode.

30. The duplex-ready SCSI backplane board of claim 29, wherein said plurality of bus switches are in a closed state for the SCSI simplex mode and in an open state for the SCSI duplex mode.

31. The duplex-ready SCSI backplane board of claim 29, wherein said primary SCSI bus and said secondary SCSI bus are joined into a single electrical bus when said plurality of bus switches are in a closed state.

32. The duplex-ready SCSI backplane board of claim 29, wherein said primary SCSI bus and said secondary SCSI bus split into are independent electrical busses when said plurality of bus switches are in an open state.

33. The duplex-ready SCSI backplane board of claim 26, wherein the state of the duplex-ready SCSI backplane board provides an indication of the desired SCSI mode.

34. The duplex-ready SCSI backplane board of claim 26, said duplex-ready logic comprising:

a set of terminators for actively terminating said primary SCSI bus and said secondary SCSI bus in the SCSI duplex mode.

35. The duplex-ready backplane board of claim 34, wherein said plurality of terminators are disabled during the SCSI duplex mode and enabled during the SCSI simplex mode.

36. The duplex-ready backplane board of claim 26, said duplex-ready logic comprising:

a first set of terminators for actively terminating said primary SCSI bus and said secondary SCSI bus in the SCSI duplex mode; and a second set of terminators for actively terminating said primary SCSI bus in the SCSI simplex mode.

37. The duplex-ready backplane board of claim 36, wherein said first set of terminators are enabled in a SCSI duplex mode and said second set of terminators are enabled in a SCSI simplex mode.

38. The duplex-ready SCSI backplane board of claim 26, said duplex-ready logic comprising:

a secondary SCSI backplane logic controller disable signal provided by said duplex-ready logic to said secondary SCSI backplane logic controller to disable said secondary SCSI backplane logic controller for the SCSI simplex mode.

39. The duplex-ready SCSI backplane board of claim 26, wherein the primary SCSI bus is a relatively fast bus and the secondary SCSI bus is a relatively low bus.

40. The duplex-ready SCSI backplane board of claim 26, said duplex-ready logic comprising:

a secondary SCSI ID control signal to the secondary SCSI bus to change the SCSI identification values for a set of SCSI devices if the computer system is a SCSI duplex ready mode and to restore the SCSI identification values for a set of SCSI devices if the computer system is in a SCSI simplex mode.

41. A method of selectively enabling a SCSI simplex mode and a SCSI duplex mode based on the state of a duplex-ready SCSI backplane board capable of connection to a primary SCSI cable carrying a primary SCSI bus and a secondary SCSI cable carrying a secondary SCSI bus, said primary SCSI bus and said secondary SCSI bus being joined as one bus in the SCSI simplex mode and said primary SCSI a bus and said secondary SCSI bus being split into independent busses in the SCSI duplex mode, comprising the steps of:

detecting whether the duplex-ready SCSI backplane board is connected to a primary SCSI cable and a secondary SCSI cable;

placing the computer system in the SCSI simplex mode if only a primary SCSI cable is detected as connected to the duplex-ready SCSI backplane board; and placing the computer system in the SCSI duplex mode if a primary SCSI cable and a secondary SCSI cable are detected as connected to the duplex-ready SCSI backplane board.

42. The method of claim 41, the duplex-ready SCSI backplane board including a secondary SCSI backplane logic controller, wherein said step of placing said computer system in the SCSI simplex mode comprises said step of placing said secondary SCSI backplane logic controller in a reset state.

43. The method of claim 41, the duplex-ready SCSI backplane board including a secondary SCSI backplane logic controller, wherein said step of placing said computer system in the SCSI duplex mode comprises said step of enabling said SCSI secondary backplane logic controller.

44. The method of claim 41, the duplex-ready SCSI backplane board including a set of SCSI devices, wherein said step of placing said computer system in the SCSI simplex mode comprises said step of said changing the SCSI identification values of the set of SCSI devices.

45. The method of claim 41, the duplex-ready SCSI backplane board including a set of SCSI devices, wherein said step of placing said computer system in the SCSI duplex mode comprises said step of restoring the SCSI identification values of the set of SCSI devices.

46. The method of claim 41, the duplex-ready SCSI backplane board having duplex-ready logic including a set of terminators, wherein said step of placing the computer system in a SCSI simplex mode comprises the step of disabling the set of terminators.

47. The method of claim 41, the duplex-ready SCSI backplane board including a plurality of bus switches, wherein said step of placing the computer system in a SCSI simplex mode comprises the step of placing the plurality of bus switches in an closed state.

48. The method of claim 41, the duplex-ready SCSI backplane board having duplex-ready logic including a set of terminators, wherein said step of placing the computer system in a SCSI duplex mode comprises the step of enabling the set of terminators.

49. The method of claim 41, the duplex-ready SCSI backplane board including a plurality of bus switches, wherein said step of placing the computer system in a SCSI duplex mode comprises the step of placing the plurality of bus switches in an open state.

50. The method of claim 41, the duplex-ready SCSI backplane board having duplex-ready logic including a first set of terminators and a second set of terminators, wherein said step of placing the computer system in a SCSI duplex mode comprises the step of disabling the first set of terminators and enabling the second set of terminators.

51. The method of claim 41, the duplex-ready SCSI backplane board having a duplex-ready logic including a first set of terminators and a second set of terminators, wherein said step of placing the computer system in a SCSI simplex mode comprises the step of enabling the first set of terminators and disabling the second set of terminators.

* * * * *